United States Patent Office 3,165,068
Patented Jan. 12, 1965

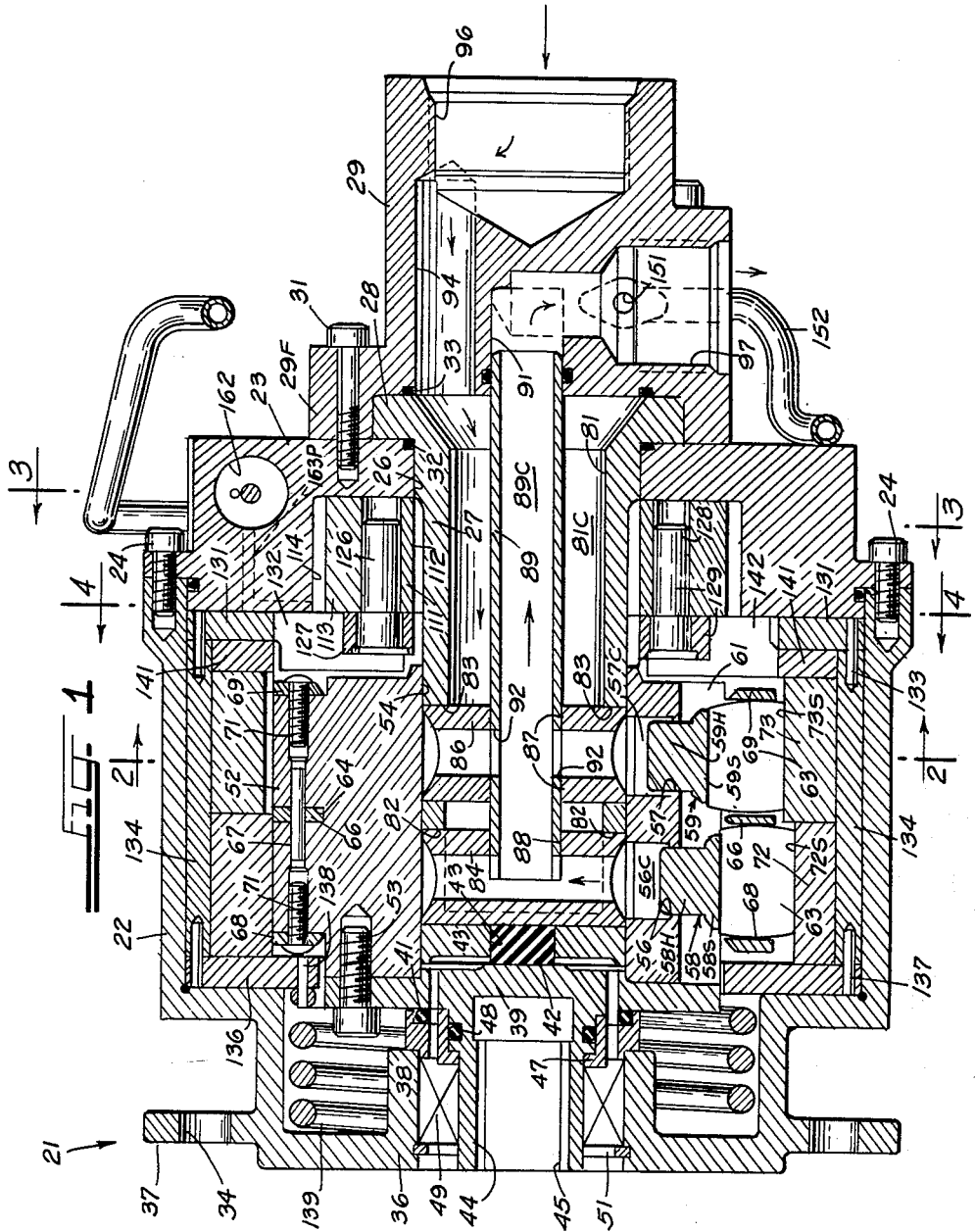

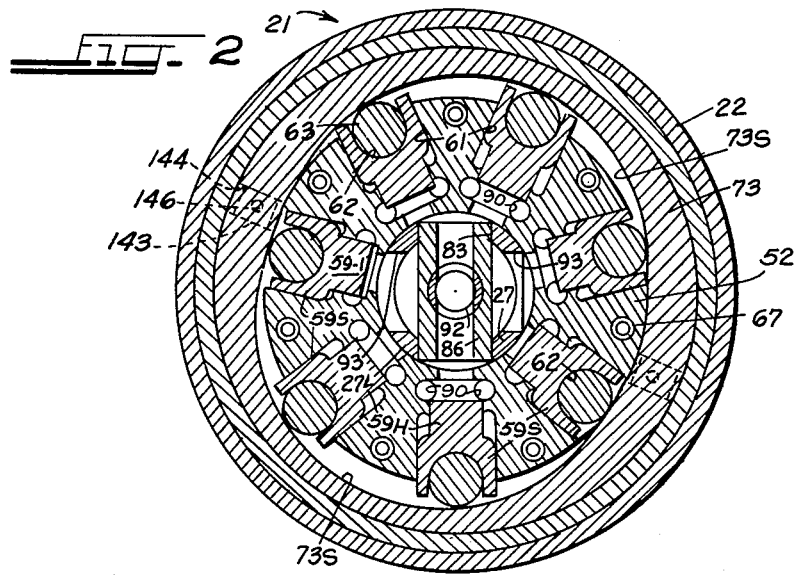
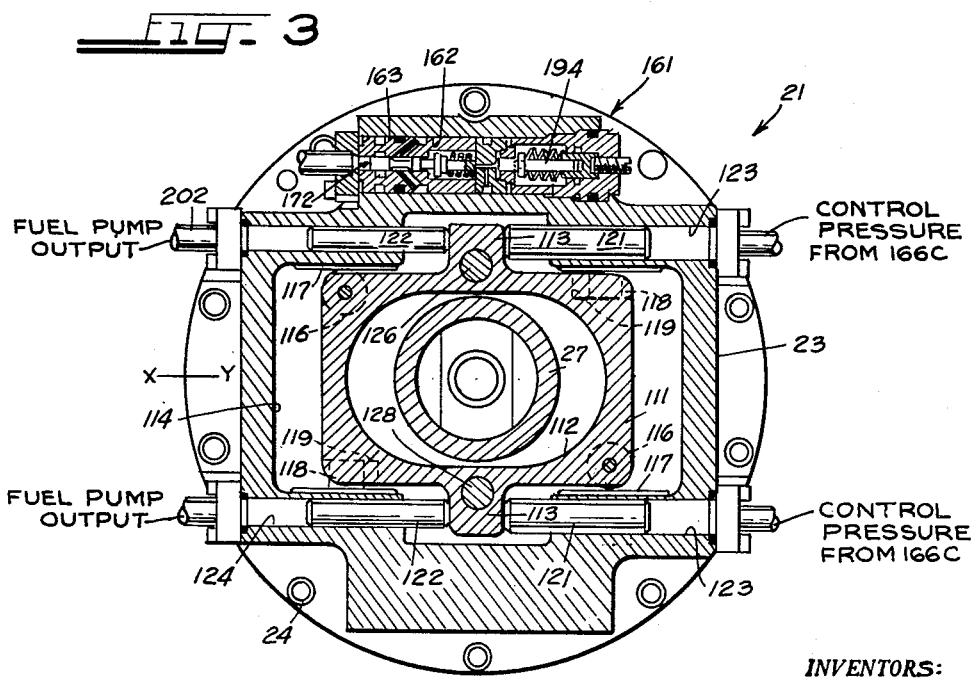

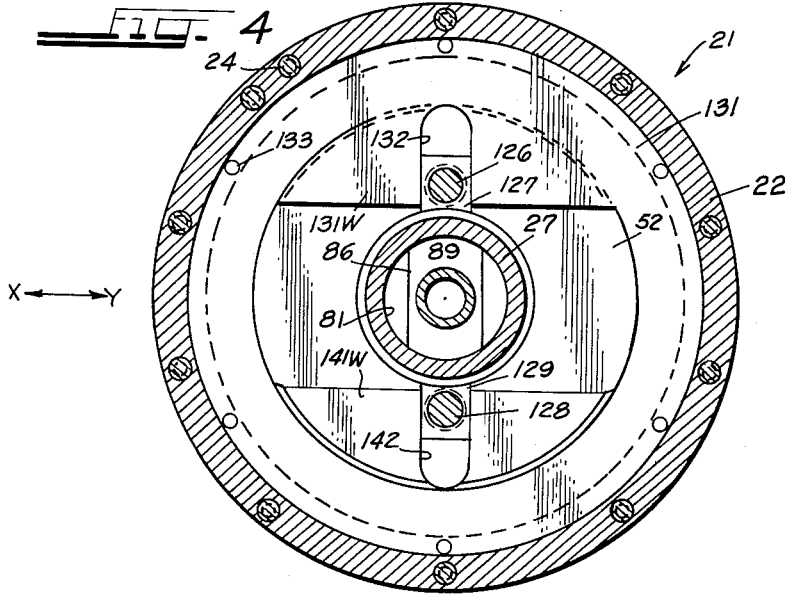
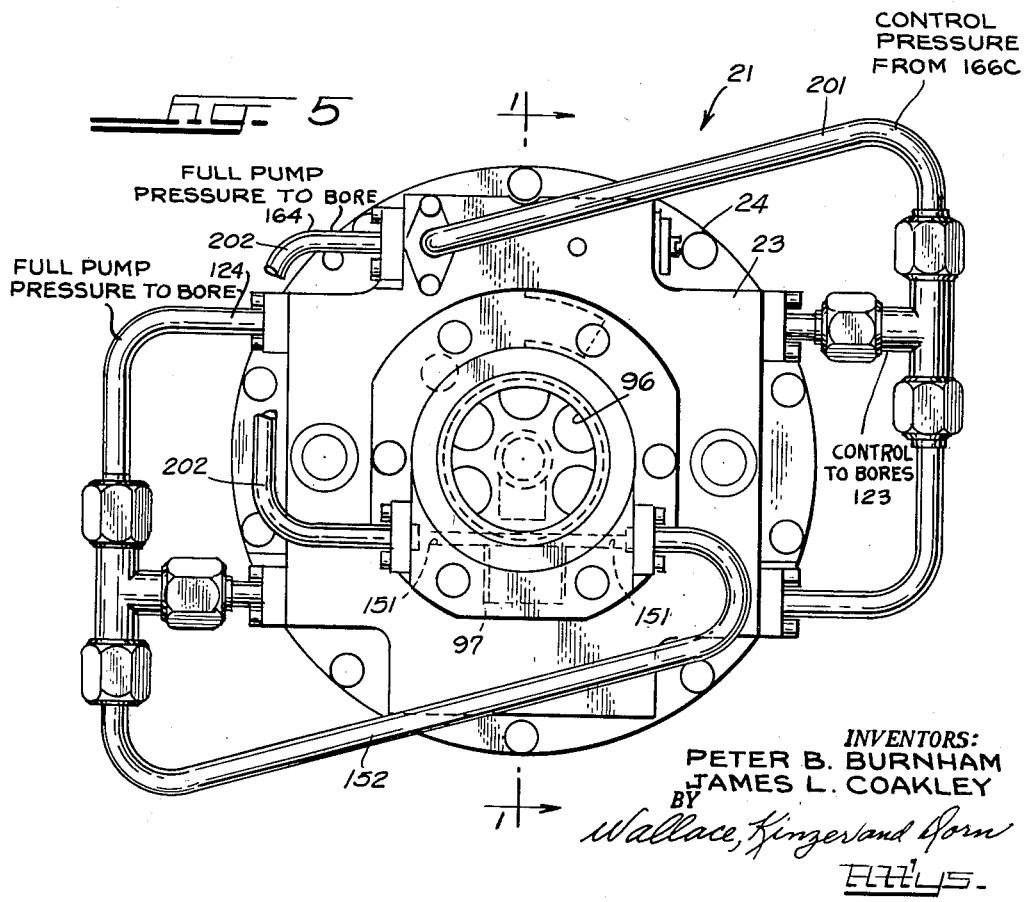

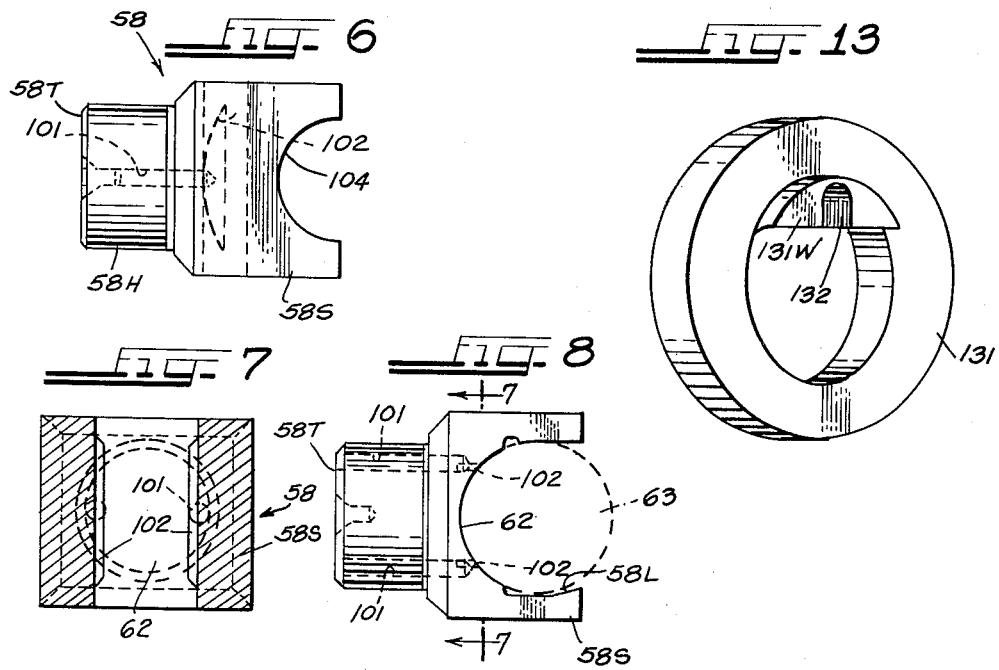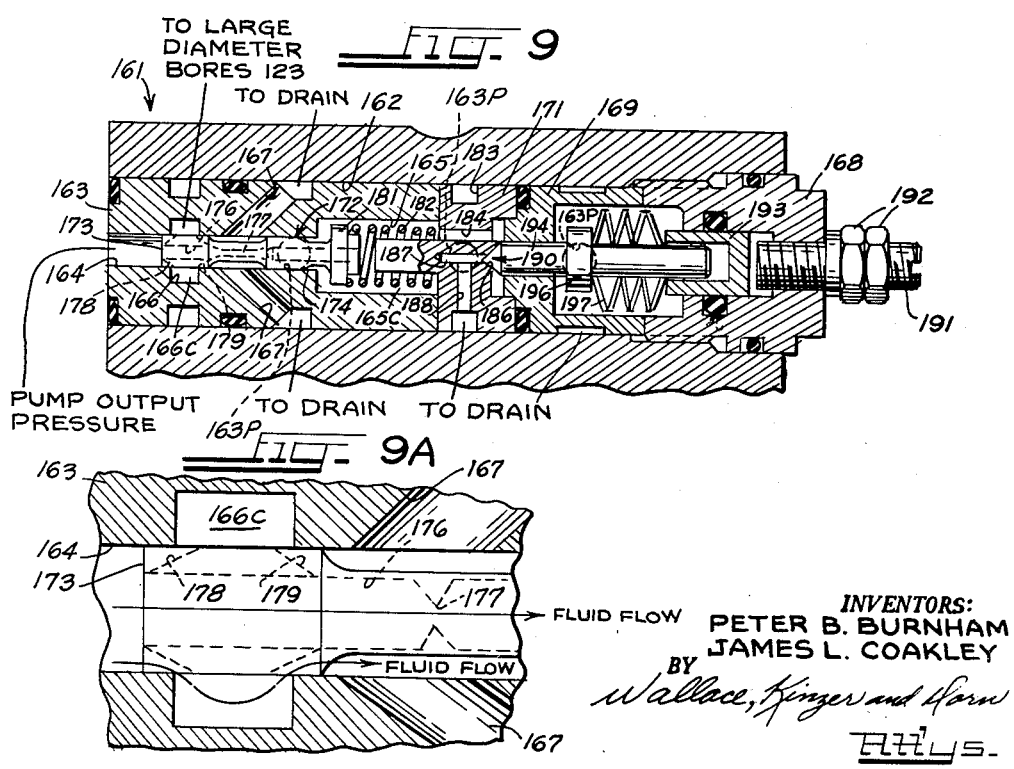

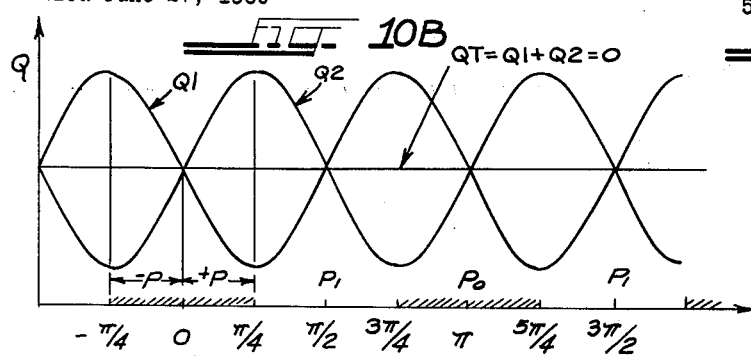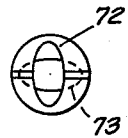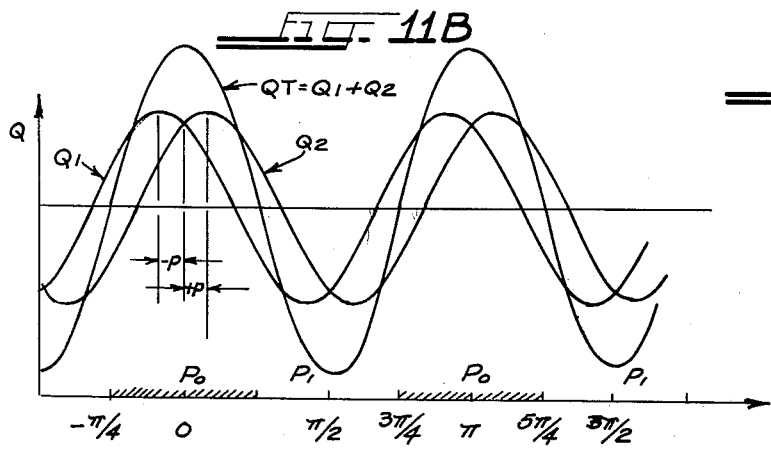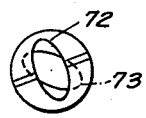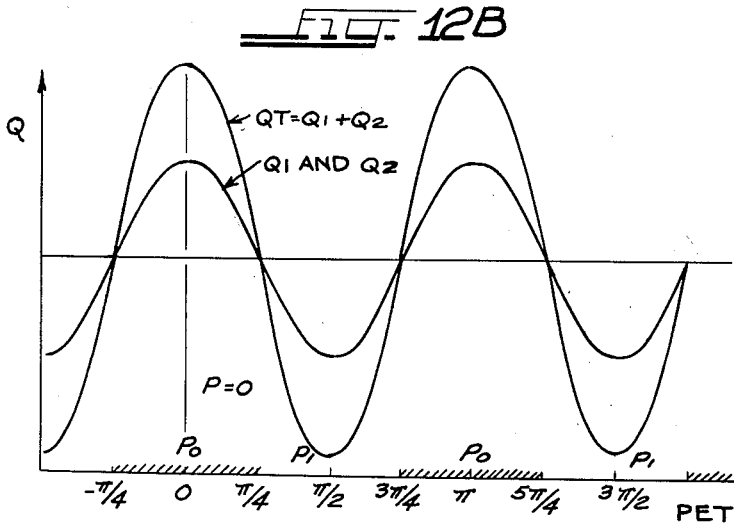

3,165,068
FLUID POWER APPARATUS
Peter B. Burnham, Boston, and James L. Coakley, Wilmington, Mass., assignors to American Brake Shoe Company, New York, N.Y., a corporation of Delaware
Filed June 27, 1960, Ser. No. 39,174
7 Claims. (Cl. 103—161)

This invention relates to fluid power devices such as pumps and motors. More particularly, this invention relates to a variable displacement pump especially adapted for high temperature operation.

A fluid power pump constructed in accordance with this invention comprises an outer housing and a piston actuating reaction member mounted therein. The reaction member is formed with an elliptical-shaped inner periphery. A rotor member is disposed within the reaction member and is formed with a plurality of circumferentially spaced and radially extending bores. Pistons are slidably disposed within the bores to define pressure chambers at the radial innermost ends thereof. Each piston includes bearing structure at the radial outer end thereof, and rotation of the rotor and pistons within the reaction member causes the pistons to be moved outwardly of the bores by centrifugal force to engage the bearing structure with the elliptical-shaped inner periphery of the reaction member. Thus, the elliptical shape of the inner surface of the reaction member causes the pistons to be reciprocated within the bores during rotation of the rotor.

To maintain effective operation of a fluid power device of this nature it is essential that metal to metal sliding contact between adjacent and relatively movable metal parts be held to a minimum, and it is a primary object of this invention to so construct the bearing structure of the pistons that a hydrodynamic wedge of lubricant is developed between the movable parts of such bearing structure as an incident of rotation of the rotor within the reaction member. To achieve this result each piston is formed with an arcuate or concave recess in the outer end which is adjacent the elliptical surface of the reaction member. The arcuate recesses afford shoes for roller bearings which are disposed therein. Whenever the rotor is rotated within the reaction member, and centrifugal force biases the pistons and rollers outwardly of the bores so that the rollers are engaged with the elliptical surface of the reaction member, the rollers roll along the elliptical surface and rotate within the shoes in the piston. Such rotation of the rollers within the concave recesses causes a hydrodynamic wedge of lubricant to be developed between the rollers and the shoes of the pistons, and the hydrodynamic wedge thus developed exerts a force on the shoe surfaces of the pistons in opposition to the centrifugal force. Thus, the hydrodynamic wedge acts to prevent engagement between the rollers and the pistons.

The problem of minimizing frictional engagement between the rollers and the pistons becomes especially acute at high temperatures such as are encountered in high pressure fluid systems. Thus, high temperatures tend to break down fluid-lubricating films between the arcuate surface of the piston shoe and the roller, and high pressures in the bores, acting on the heads of the pistons, impose additional loads on the piston shoe and roller bearing arrangement. This may lead to seizure between the piston and the rollers and cause the rollers to skid along the elliptical surface of the reaction member, causing undue wear and eventual malfunctioning or failure of the fluid power device. This can present a serious problem, particularly in an aircraft installation. It is therefore another object of this invention to develop a lubricating arrangement wherein a pad of pressurized fluid is developed and maintained between the arcuate surface of the piston shoe and an associated roller to thereby add additional support to the hydrodynamic wedge of lubricant produced by rotation of the roller within the shoe as aforesaid.

In accordance with this invention each of the pistons is formed with radially extending conduits for transferring high pressure fluid from the pressure chambers to the arcuate surface of the piston shoe. Additionally, elongated slots are formed in the arcuate surface of the piston shoe, which slots communicate with the passageways within the piston. By reason of this construction, pressurized fluid is transferred to the shoe surface of the piston and thereby tends to balance the pressure forces developed on the inner end of the piston. Thus, the fluid thus transferred through the passageways forms a pad of pressurized fluid which acts in conjunction with the hydrodynamic wedge to maintain effective lubrication between the piston shoe and the roller regardless of the temperatures encountered.

In one form of a variable displacement pump constructed in accordance with the present a rotor as described above is formed with a second bank of radially extending bores in parallel relation to, but axially spaced from a first set of bores as described above. In this manner a bore in one bank is disposed in tandem alignment with a bore in the other bank. Each tandem pair of bores is connected by cross ports in the rotor. The two banks of bores thus formed in the rotor are connected by common inlet and common outlet conduits, and a second elliptical-shaped reaction member and set of pistons are included in such a variable displacement pump. Inasmuch as the two sets of bores in the rotor are in parallel disposition and are interconnected by cross ports and common inlet and common outlet conduits, the displacement of such a pump may be varied by shifting the axes of the two elliptical reaction members with respect to one another to correspondingly vary the phase relationship between the pumping action of the two banks of pistons, and another object of this invention is to impart counter-rotation to the reaction members in a novel way to vary the pump output.

In a variable displacement pump as described above, changes in load on the pump are reflected in corresponding changes in the output pressure of the pump. In accordance with this invention, a yoke member is arranged to be shifted back and forth in one coordinated direction by a pair of different size rams or pistons to effect counter-rotation of the elliptical reaction members. Full pump output pressure is applied to the smaller of the two rams, but a control pressure is developed by a valve arrangement and is applied to the larger of the two rams. The valve arrangement which develops the control pressure includes a spool-type valve which is subjected to full output pressure at one end and a biasing force at an opposite end. A significant portion of the biasing force is afforded by a regulated pressure obtained from the output pressure of the pump. Because a large portion of the biasing force is afforded by such a regulated pressure, a low spring force may be utilized to provide the remainder of the bias, and problems of cocking and sticking of the valve spool with off-center spring forces are minimized. It is another object of this invention to incorporate the foregoing in a novel automatic operating displacement control mechanism for a variable displacement pump.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is an elevation view in section of a variable displacement pump constructed in accordance with one embodiment of this invention and taken approximately along the line indicated by the arrows 1—1 in FIG. 5;

FIG. 2 is an elevation view in section taken approximately along the line indicated by the arrows 2—2 in FIG. 1;

FIG. 3 is an elevation view, partly in section, taken in the direction of the arrows 3—3 in FIG. 1;

FIG. 4 is an elevation view, partly in section, taken in the direction of the arrows 4—4 in FIG. 1;

FIG. 5 is an end elevation view of the pump shown in FIG. 1;

FIG. 6 is a plan view of a piston utilized in the pump illustrated in FIG. 1;

FIG. 7 is an elevation view, partly in section, of the piston shown in FIG. 6 and taken approximately along the line indicated by the arrows 7—7 in FIG. 8;

FIG. 8 is a side elevation view of the piston shown in FIG. 6;

FIG. 9 is a sectional elevation view of a control valve assembly which is also shown in FIG. 3;

FIG. 9A is an enlarged detail view of a portion of the control valve assembly illustrated in FIG. 9;

FIGS. 10A, 11A, and 12A are schematic views illustrating the relative disposition of the elliptical-shaped reaction members of the variable displacement pump shown in FIG. 1 in three different phases of operation of the pump;

FIGS. 10B, 11B, and 12B are diagrams graphically illustrating the output flow of the variable displacement pump for the different inclinations of the elliptical reaction members as illustrated in the respective FIGS. 10A–12A; and FIG. 13 is a reduced perspective view of a ring member utilized in the pump illustrated in FIG. 1.

With particular reference to FIGS. 1–5 of the drawings a variable displacement pump constructed in accordance with one embodiment of this invention is indicated generally by the reference numeral 21. The pump 21 comprises an outer housing or casing 22, and a right-hand end plate 23 as viewed in FIG. 1. The end plate 23 is attached to the housing 22 by a plurality of cap screws 24 and is formed with a relatively large central opening 26. A pintle 27 is received within the opening 26 and includes an outwardly directed flanged portion 28. A cap-shaped housing 29 is mounted on the end plate 23 by a plurality of cap screws 31 extended through the projections 29F into the righthand wall of the end plate 23. This clasps the flange 28 of the pintle between the end plate 23 and the housing 29 and thereby retains the pintle 27 in a fixed position within the casing 22. O-rings 32 and 33 are disposed within suitable recesses formed in the end plate 23 and the housing 29 so as to afford a fluid-tight seal at either side of the pintle flange 28.

The end of the housing or casing 22 opposite that mounting the end plate 23 is formed with a sleeve portion 36 directed axially inwardly from the center thereof. This end of the outer housing 22 also includes an outwardly directed flange 37 having openings 34 for facilitating mounting of the pump 21 to the apparatus with which it is to be associated. A bearing holder 38 is formed with a stepped construction so as to be mountable on the innermost end of the sleeve 36.

A flanged drive member 39 is maintained in axially spaced relation within the outer housing 4 by a pair of carbon thrust bearings 41 and 42. The carbon thrust bearing 41 is of an annular configuration and is mounted within a recess formed in the bearing ring 38. This thrust bearing 41 is positioned to engage one face of the flange portion of the flanged drive member 39. The carbon thrust bearing 42 is mounted in a central opening 43 in the innermost or left-hand end of the pintle 27 so as to be engageable with a surface of the flange drive member opposite that engaged by the carbon thrust bearing 41.

The drive member 39 includes an axially extending tube-like portion 44 which is formed with internal grooves 45 adapting the drive member for connection to a drive shaft. A mating ring 47 of L-section is mounted on the drive member 39 at the inner end of the shaft portion 44 so as to enclose a packing 48 disposed within an annular groove formed in the drive member 39. A shaft seal 49 is interposed between the sleeve 36 and the axially extending shaft portion 44 of the drive member. The shaft seal 49 is retained in fixed axial position by the mating ring 47 which abuts one end of the shaft seal and by a retaining ring 51 which engages the opposite end of the shaft seal 49.

A rotor 52 is generally centrally disposed within the outer housing 22 between the drive member 39 and the end plate 23, and is connected to the flanged drive member 39 by a plurality of cap screws 53. The rotor 52 is formed with a central opening 54 and the pintle 27 is disposed therein so that the rotor 52 is rotatable on the inner end portion of the pintle 27. The rotor 52 is formed with two axially spaced banks of radially extending bores 56 and 57. The bores in each bank are circumferentially spaced from one another and are equal in number, in this case seven in number. Each bore 56 is aligned in parallel relationship with a bore 57, and pistons 58 and 59 are slidably disposed within the respective bores 56 and 57. The pistons 58 and 59 are of identical construction. The construction of a piston is shown in detail in FIGS. 6–8 and will be described in detail hereinafter. For the present, and with reference to FIGS. 1 and 2 in particular, it is seen that each piston includes a head end portion 58H or 59H, as the case may be, which is receivable within the bores 56 and 57 and which defines a pressure chamber 56C or 57C within its respective bore. The rotor 52 is formed with a plurality of axially extending slots 61 disposed radially outwardly from the bores 56 and 57. The slots 61 have a width which is somewhat greater than the diameter of a bore. The pistons 58 and 59 are formed with shoe portions 58S and 59S, which are generally square-shaped in cross section, and which are slidably received between the side walls of the slots 61. In this manner the pistons in each bank are maintained in the aforesaid parallel alignment with one another. Each shoe end portion of a piston includes a generally arcuate-curved surface 62 which affords a mount for a roller bearing 63 therein.

With particular reference to FIG. 1 it is seen that the rotor 52 includes an annular recess 64 in the outer cylindrical surface thereof. A roller separator plate 66 is retained in position within the recess 64 as by a pin 67 and serves to maintain the adjacent ends of the rollers in each bank of pistons in spaced-apart relationship with one another. Roller retainer plates 68 and 69 are attached to the outer peripheral portions of the end faces of the rotor 52 by cap screws 71 so as to engage the non-adjacent ends of the rollers 63 and thereby retain the rollers in axial position with respect to the rotor 52 and the pistons 58 and 59.

A pair of reaction members 72 and 73, each of generally annular configuration, but formed with elliptical-shaped inner surfaces or races 72S and 73S, respectively, see FIG. 2, are disposed radially outwardly of the respective banks of pistons 58 and 59. Each of the reaction members 72 and 73 is rotatable to a limited extent within the outer housing 22 in a manner such that movement of one reaction member in one direction of rotation occurs simultaneously with movement of the other reaction member in an opposite direction of rotation to vary the pump output as will presently be described.

With particular reference to FIGS. 1 and 2, it is seen that the pintle 27 includes an inner bore 81 which extends substantially throughout the entire axial length of the pintle. The innermost end portion of the pintle 27 is formed with two axially spaced pairs of openings 82 and 83 in the side walls of the pintle with the individual openings of each respective pair of openings 82 and 83 diametrically opposed to one another. The openings 82 and 83 are aligned with one another and cross tubes 84 and 86 are mounted with opposite ends in each respective pair of openings 82 and 83. The axial disposition of the cross tubes 84 and 86 is such that the interior of these tubes periodically communicate with the chambers 56C and 57C in the rotor 52 during rotation of the rotor 52 about the pintle 27. The cross tube 86 is formed with a pair of aligned openings 87 in the side walls thereof, and the cross tube 84 is formed with an opening 88 in one side wall thereof. A sleeve or tube 89 is mounted at one end within the respective openings 87 and 88 in the cross tubes 84 and 86 and extends axially along the bore 81 in concentric disposition within the pintle 27 to the housing 29 wherein the opposite end of the tube 89 is received within an outlet passageway 91 formed internally of the housing 29. The tube 89 includes openings 92 which extend therethrough to communicate the interior of the tube 89 with the interior of the cross tube 86. Thus, it is seen from FIG. 1 that the cross tubes 84 and 86 and the tube 89 afford a common manifold for communicating the chambers 56C and 57C with the outlet passageway 91.

As best viewed in FIG. 2, it will be noted that the pintle 27 is also formed with a pair of openings 93 in the side walls thereof at locations displaced ninety degrees from the openings 83 which receive the cross tube 86. Similarly, the pintle 27 includes a pair of openings which are circumferentially aligned with the openings 82 but displaced ninety degrees therefrom. In this manner, the chambers 56C and 57C periodically communicate with the annular chamber 81C defined between the pintle 27 and the concentrically disposed tube 89. This structure constitutes a common manifold for communicating the chambers 56C and 57C with an inlet passageway 94 in the housing 29, which pasageway 94 is separate from the passageway 91 noted hereinabove.

As illustrated in FIG. 1, the passageways 91 and 94 communicate with respective openings 96 and 97 formed in the housing 29 for the reception of inlet and outlet conduit couplings. Fluid flow through the pump 21 follows the path generally indicated by the arrows from the inlet opening 96, through the passageway 94, through the chamber 81C and to the respective chambers 56C and 57C. Assuming that the reaction members are positioned to effect maximum displacement of the pump in a manner presently to be described, the fluid flows from the chambers 56C and 57C through the tube 89 to the passageway 91 and through the outlet opening 97. To accomplish such pumping of fluid through the pump 21 in the direction as above described, the rotor 52 is rotated in a counterclockwise direction as viewed in FIG. 2. From an inspection of FIG. 2, it is apparent that each piston 59 completes two pumping cycles during one complete revolution of the rotor 52. Thus, and starting with a piston in the position indicated as 59–1, each piston moves progressively outwardly of an associated chamber 57C in moving counterclockwise past the opening 93. As the diameter of the inner surface 73S of the reaction member 73 decreases in the portion of the arc adjacent the opening 83 and the open end of the cross tube 86, the piston 59–1 is moved inwardly and thereby pressurizes fluid within the respective chamber 57C and causes such fluid to flow through the cross tube 86. Continued rotation of the rotor effects a second intake and output stroke as the piston moves circumferentially past the ports 93 and 83 and back to the initial position indicated as 59–1. Thus, from an inspection of FIG. 2, it will be apparent that rotation of the reaction member 73 about the pintle 27 will effect a change in the phasing of the intake and output strokes of the pistons 59 with respect to the ports 83 and 93. During such rotational movement of the piston 59 centripetal force is effective to bias the piston 59 outwardly of the chamber 57C and the roller 63 rolls along the elliptical periphery 73S while rotating within the arcuate shoe portion 59S of the piston.

In accordance with the present invention the manner in which a roller is thus rotated within an arcuate shoe portion of a piston causes a wedge of lubricant to be developed between roller and the arcuate bearing surface of the piston to thereby achieve hydrodynamic lubrication. The force resulting from this hydrodynamic wedge acts in opposition to and is effective to balance out the centrifugal force of the pistons. While such a hydrodynamic wedge is by itself sufficient to prevent contact between a roller and a shoe in some conditions of operation of the pump, such as operation at low outlet pressures and low temperatures, operation of the pump at high fluid outlet pressures and high temperatures tends to break down such a hydrodynamic wedge.

Under the present invention, a pressure-balancing pad of lubricating fluid is maintained between each of the rollers 63 and their associated pistons 58 and 59 to add additional support to the hydrodynamic wedge and thereby help prevent seizure between a roller and a piston. The structural features which enable the pressure-balancing pad to be obtained are best illustrated in FIGS. 6–8 wherein a piston 58 is shown in enlarged detail. In these figures it is seen that two passageways 101 are formed in the piston so as to extend from the top surface 58T through the piston to the arcuate surface 62 which forms the bearing surface for the roller 63 described hereinabove. The passageways 101 terminate in spaced-apart and parallel disposed grooves 102 which are recessed in the arcuate surface 62. Thus, the pressurized fluid from the chambers 56C and 57C is transmitted radially through each of the pistons 58 and 59 to the grooves 102 in the roller-receiving shoe portions 58S of the pistons. The pressurized fluid thus transmitted through the passageways 101 forms a pressure pad in and between each of the grooves 102 which is effective to balance a substantial portion of the pressure force exerted on the top surface 58T of the piston and thereby helps prevent engagement between the roller 63 and the arcuate surface 62. Thus, the pressure balance arrangement afforded by the passageways 101 and grooves 102 provides greatly diminished bearing loads even in the presence of high temperatures.

The pressure balance thus obtained by admitting fluid under pressure to the elongated slots supports from 90 to 95% of the force caused by high pressure fluid acting on the inner surface of the piston and is independent of rotation of the roller. However, advantage is taken of the hydrodynamic wedge which is created by the rotation of the roller 63 in the piston shoe to balance out the remainder of the pressure force developed on the top surface 58T of the piston. Thus, the hydrodynamic wedge, while providing all of the force for balancing the centrifugal force of the piston, provides only a small portion of the force, in the order of 5 to 10%, for balancing the pressure force developed on the top surface of the piston.

As illustrated in FIG. 8 each piston 58 is formed with a retaining lug affording a small angled surface 58L for preventing the rollers 63 from coming out of the piston shoes when the rotor of the pump is not rotating. Also, as illustrated in FIG. 6, the pistons 58 may be provided with a recess 104 in each of the leg portions which define the roller-receiving recess 62. Such recesses provide clearance for an arbor that supports a slitting saw used to cut the grooves 102 during the manufacture of the pistons.

The means effecting counter-rotation of the reaction members 72 and 73 for varying the pump output, in the manner noted generally hereinabove, include a yoke member 111 as shown in end elevation in FIG. 3. The yoke member 111 includes both an elongated central opening 112, which straddles the pintle 27, and projecting lugs 113. The yoke member is adapted to be reciprocable linearly in a single coordinate direction indicated by the arrows X and Y in FIG. 3 within a recess 114 formed in the inner surface of the end plate 23. Guide means, which include a pair of rollers 116 mounted at opposite corners of the yoke member and rollable along corresponding guide surfaces 117 formed in the recess 114, and which also include key members 118 projecting from the recess 14 and slidable in corresponding keyways 119 of the yoke member, are provided for maintaining axial and rotational alignment of the yoke member 111 with respect to the end plate 23. Each lug 113 is engaged on the opposite surfaces thereof by a large piston 121 and a small piston 122. These pistons are, in turn, reciprocable within respective bores 123 and 124 formed in the end plates 23 and are effective to move the yoke member in a direction dependent upon the relationship between the pressures in the bores 123 and 124.

A pin member 126 is mounted within the uppermost lug 113, as viewed in FIGS. 1 and 3, so as to project inwardly from the inner face of the yoke member. The inwardly projecting end of the pin member 126 mounts a generally square-shaped collar 127 thereon, FIGS. 1 and 4, adapted to shift the related ring member in a way to be explained. In like manner the lowermost lug 113 mounts a pin member 128 in a suitable opening therein, and a collar member 129 is mounted on the inwardly projecting end of the pin member.

With particular reference now to FIGS. 1, 4, and 13 a ring member 131 is disposed immediately adjacent the innermost surface of both the end plate 23 and the upper lug 113 of the yoke member. The ring member 131 includes a web section 131W which extends across the upper portion thereof, as viewed in FIG. 4, and which is formed with a keyway 132 for receiving the collar member 127 therein. The collar member 127 is freely movable in a radial direction within the keyway 132 to accommodate any rotational movement of the ring member 131 produced by movement of the yoke member 111 and pin 126 in the direction indicated by the arrows X or Y in FIG. 4.

The ring member 131 constitutes an actuator ring for the reaction member 72 and is connected by a series of dowels 133 to a sleeve 134 which is nestled between the inner surface of the outer casing 22 and the circular periphery of the reaction members 72 and 73. The end of the sleeve 134 opposite that connected to the ring member 131 is connected to spring return ring 136 by a series of dowel pins 137. The spring return ring 136 is in turn pinned at 138 to a torsion return spring 139, which is effective to bias the reaction members toward maximum pump output as will become more apparent hereinafter. The reaction member 72 may be connected for rotation with the spring return ring 136 and the sleeve 134 by any suitable means. Preferably, a roll-pin arrangement similar to that to be described in detail with reference to the reaction member 73, and illustrated in FIG. 2, is utilized.

The collar member 129, affixed to the lower pin 128 as viewed in FIG. 1, is adapted to act as a key member for rotating the reaction member 73 by structure which is similar to that described hereinabove with respect to the collar member 127 and reaction member 72. With continued reference to FIGS. 1 and 4 of the drawings it is seen that a second ring member 141 is positioned between the lowermost portion of the ring member 131 and the rotor 52, as viewed in FIG. 1. The ring member 141 includes a web section 141W which extends across the lower portion thereof, as viewed in FIG. 4, and which is formed with a keyway 142. A collar member 129 is vertically slidable within the keyway 142 to effect rotation of the ring member 141 in accordance with reciprocable movement of the yoke member 111.

With reference now to FIG. 2, a preferred manner of connecting the reaction member 73 for rotation with the ring member 141 is illustrated and comprises a key member 143 which is radially slidable within a keyway 144 formed in the reaction member 73. The key member 143 may be pinned to the ring member 141 by a dowel 146. As noted hereinabove, a similar construction may be provided for connecting the reaction member 72 to the spring return ring 136.

At this point, the operation of the variable displacement pump 21 will be reviewed with relation to movement of the yoke member 111 and with reference to FIGS. 10A and 10B through 12A and 12B. As noted hereinabove in the description of the pumping cycle of the piston 59–1 in FIG. 2, the phasing of the pumping cycle of the pistons in either race or reaction member 72 and 73 can be varied with respect to the inlet and outlet openings in the pintle 27 by variation of the angular orientation of the reaction members 72 and 73 with respect to the immovable pintle 27. In FIGS. 10A, 11A, and 12A, the relative dispositions of the major axes of the elliptical reaction members with respect to one another for different pump output flows are schematically illustrated. Respective FIGS. 10B–12B graphically illustrate the flow of fluid through the variable displacement pump 21 corresponding to the relative dispositions of the reaction members as illustrated in FIGS. 10A–12A. Thus, in each of FIGS. 10B–12B the cycle of flow through the bank of pistons 58 is indicated by the sinusoidal curve noted as Q1 and is plotted against angular rotation of the rotor 52 expressed in radians. Likewise, the flow cycle through the bank of pistons 59 is denoted by the sinusoidal curve Q2. The sum of the flow of the two banks of pistons is indicated by the curve QT in each instance. The portions of the rotational movement of the rotor constituting the output phase of the overall pump cycle are designated PO while the intake phase of the pump is indicated as PI in each of FIGS. 10B–11B. The phase angle through which the reaction members 72 and 73 are rotated from the maximum flow condition are indicated by the letter P. Thus, with the relative disposition of the reaction members 72 and 73 as illustrated in FIG. 10A the phasing of the pumping action of the two banks of pistons 58 and 59 is such that the piston in one bank is 180° out of phase with a related and parallel aligned piston in the other bank so that the fluid displaced on the output stroke of the piston in one bank is transferred to the pressure chamber of the piston in the other bank on the intake stroke of the latter piston. Thus, in this condition of operation fluid flow can only cycle back and forth between the pressure chambers 56C and 57C of the two banks of pistons. Such flow occurs primarily through axially extending cross ports 90 interconnecting aligned bores in the two banks of pistons (see FIG. 2). Such flow also occurs through the related openings in the pintle 27 and the chambers 81C and 89C except when the pistons are centered over a land such as 27L on the pintle. Therefore, the pump 21 is not effective to pump any fluid between the inlet and outlet openings 96 and 97 and the displacement does not vary from the zero level as indicated in FIG. 10B.

However, when the yoke member 111 is shifted to a position wherein the major axes of the reaction member 72 and 73 are aligned with one another, as illustrated in FIG. 12A, the two banks of pistons 58 and 59 pump in phase with one another, as indicated by the superposing of the curves Q1 and Q2 in FIG. 12B, and the total output of the pump 21 is a maximum, as indicated by the curve QT in FIG. 12B. It will be apparent therefore that the pump output can be continuously varied to provide any output flow between the minimum and maximum values as illustrated in FIGS. 10B and 12B. In FIG. 11B the output flow that is obtained with the reaction members 72 and 73 disposed in approximately 45° relation to one another, as schematically illustrated in FIG. 11A, is graphically portrayed. This disposition of the reaction members 72 and 73 is substantially that illustrated in FIGS. 1-4.

In accordance with this invention control means for maintaining a constant pump output are incorporated in the variable displacement pump 21. As noted hereinabove, the position of the yoke member 111 within the recess 114 of the end plate is determined by the fluid pressures within the bores 123 and 124. Conduit means are provided for applying full pump output pressure to the bores 124 to act on the small pistons 122. With particular reference to FIGS. 1 and 5 it is seen that such conduit means include a passageway 151 in the housing 29, which passageway communicates with the outlet opening 97. Tubing 152 conducts fluid under pressure from the passageway 151 to the chambers 124. A control pressure is applied to the ends of the larger pistons 121 in the bores 123 to develop a force which acts in opposition to the force developed by the pump output pressure acting on the smaller pistons 122. Preferably, the area of the smaller pistons 122 is one half that of the larger pistons 121 so that the yoke member 111 is maintained in a state of equilibrium whenever the control pressure in the bores 123 is one half the full pump output pressure as applied to the pistons 122.

The control pressure applied to the pistons 121 is developed by a valve assembly indicated generally by the reference character 161 in FIG. 3 and illustrated in enlarged detail in FIG. 9. The component parts of the valve assembly 161 are mounted within a cylindrical bore 162 in the end plate 23. As illustrated in FIG. 1, the bore 162 is vented to drain by a passageway 163P. The control valve assembly 161 includes a sleeve member 163 concentrically disposed within the bore 162. The sleeve 163 is formed with an axially extending bore 164 and an annular recess 166 in the bore 164. The right-hand end of the sleeve 163 is formed with a counter bore 165. The sleeve 163 also includes a pair of inclined passageways 167 which communicate the bore 164 with the drain passageway 163P (see FIG. 1).

One end of the bore 162 in the end plate 23 is closed by a cap member 168 which may be threaded or otherwise secured in fixed axial position within the bore 162. A guide member 169 and a block member 171 are interposed in abutting relation between the ends of the sleeve 163 and the cap 168. The block member 171 thus defines a chamber 165C with the counter bore 165 of the sleeve 163.

A valve spool 172, having first and second land portions 173 and 174 interconnected by a portion of reduced diameter, is slidably disposed within the bore 164. The valve spool 172 is formed with an inner passageway 176 which extends axially therethrough and which includes a fixed restriction 177 therein. The land portion 173 of the valve spool 172 includes peripheral inclined slots 178 and 179 in the opposite ends thereof. As will presently be explained these slots 178 and 179 provide a low gain function in conjunction with the annular recess 166 in the sleeve member. The valve spool 172 also includes an enlarged collar 181 at one end thereof which collar provides a seat for a bias spring 182. The bias spring 182 is seated at the end opposite the collar 181 on a lateral face of the block 171.

The block 171 includes an annular recess 183 in the outer periphery thereof and connected to drain. A passageway 184 extends through the block 171 to afford a path for the free flow of fluid therethrough. A tapered valve seat 186 is formed on the face of the block 171 opposite that engaged with the sleeve 163. Passageways 187 and 188 communicate the valve seat 186 with the annular recess 183 and thus to drain.

A threaded stud 191 is adjustably positionable within the cap 168 by a pair of lock nuts 192 to vary the axial position of an adapter member 193. The adapter member 193 is formed with a bore for mounting one end of a poppet valve 194 therein. The opposite end of the poppet valve 194 is slidably disposed within the guide 169. The poppet valve 194 includes an annular collar 196, and a stack of belleville springs 197, or the like, are interposed between the collar 196 and the adapted member 193. Thus, movement of the adapter member 193 axially toward or away from guide 169 by rotation of the stud 191 is effective to exert a variable compressive force through the spring stack 197 on the poppet valve 194. The force on the left end of the poppet valve 194 caused by the pressure in chamber 165C is balanced by the belleville spring stack 197. The poppet valve will remain closed until the pressure force becomes greater than the belleville spring force at which time the poppet valve opens bleeding the pressure to drain. When the pressure in chamber 165C drops, the valve 194 closes. Thus, an equilibrium condition is met when the pressure force just balances the belleville spring force. At equilibrium, the poppet valve is partially opened just enough to pass the flow coming through restriction 177. The pressure in chamber 165C may therefore be quite accurately regulated.

There are therefore two possible paths for fluid flow from the leftwardmost end of the bore 164 to drain. One path for fluid flow is through the bore 176, fixed restriction 177, to the chamber 165C, and then through passageway 184 and variable restriction 190 to drain. Flow through this path occurs continuously and produces a regulated pressure in chamber 165C between the fixed and variable restrictions 177 and 190. This regulated pressure acts on the rightward end of the valve spool 172 in opposition to the pump output pressure acting on the leftward end of the valve spool 172, as viewed in FIG. 9. The other path for fluid flow is from the bore 164, through the slots 178, to the chamber 166C, and then through the slots 179 to drain (see enlarged detail FIG. 9A). This path of flow produces a control pressure in the chamber 166C as will now be described.

The operation of the component parts of the valve assembly 161 is such that the control pressure applied to the pistons 121 is developed within the annular chamber 166C defined by the recessed surface 166 in the sleeve member 163. With reference to FIG. 5 it is seen that conduit means including tubing 201 are connected to the end plate 23 for receiving the control pressure developed in the annular chamber 166C and for transferring such control pressure to the bores 123. Also, as illustrated in FIG. 5, full pump output pressure is applied to the bore 164 and the end surface of the spool valve 172 by a conduit 202 connected to the valve assembly 161 at one end and the passageway 151 at its opposite end.

In the operation of the variable displacement pump 21 the pump output pressure varies in response to changes in load. Thus, a decrease in the output pressure indicates the need for increased fluid flow from the pump while increasing pump output pressure indicates that the total output flow of the pump is to be reduced. The control valve assembly 161 and the yoke arrangement including the actuator rings described hereinabove automatically regulate the displacement of the pump in accordance with changing load requirements on the pump. Specifically, the axial position of the land portion 173 of the spool valve 172 is effective to regulate the control pressure developed in the chamber 166C and transmitted to the pistons 121. In the equilibrium position the land portion 173 is positioned so that the restrictions formed by the slots 178 and 179 with the edges of the recess 166 are equal whereby the control pressure within the chamber 166C is one half that of the pump output pressure in the bore 164. Thus, in the equilibrium position the forces exerted by the pistons 121 and 122 on the lugs 113 of the yoke member 111 are equal and the yoke member 111 remains stationary. Consequently, the pump output is maintained at a constant value, which corresponds to the position of the yoke member 111.

The axial position of the valve spool 172 is, in turn, determined by the force exerted by the full pump output pressure acting on one end of the valve 172 and the sum of the forces due to the regulated pressure in chamber 165C acting on the opposite end of the valve 172 and the bias force of the spring 182. The regulated pressure supplies the greater portion of the force which opposes the force of the pump output pressure, and this regulated pressure is determined by the present compressive force in spring stack 197. Thus for any one setting of the stud 191 there can be only one pump output pressure which will result in an equilibrium position of the valve spool 172. A small drop in the pump output pressure permits the valve spool 172 to move leftwardly, as viewed in FIG. 9, to decrease the size of the restriction between the slots 178 and the edge of the recess 166 while increasing the size of the restriction between the slots 179 and the edge of the recess 166. The control pressure in the chamber 166C is correspondingly decreased which results in the yoke member 111 being shifted to the right, as viewed in FIG. 3, to increase the output flow and thus the output pressure of the pump 21. Thus, for slight changes in output load on the pump the slots 178 and 179 function as a low gain compensator. However, should there be a change in the output load on the pump 21, and a resultant change in the output pressure in the bore 164, the land portion 173 is shifted to provide full peripheral porting of the chamber 166C either to communicate the chamber 166C with the pump output pressure in the bore 164 or to vent the chamber 166C to drain through the passageways 167.

The biasing force afforded by the regulated pressure between the fixed restriction 177 and the variable restriction 190 serves two important functions. First of all, the biasing force obtained from this regulated pressure reduces the force required of the spring 182 and thus reduces the possibility of cocking and sticking of the valve spool 172 by reason of an off center spring force. Secondly, because only a relatively low spring force is required of the spring 182, inasmuch as the largest portion of the biasing force is provided by regulated pressure, the spring 182 may be relatively small to thereby enable the overall size of the control valve assembly to be reduced.

Thus, in accordance with this invention there is provided control mechanism for automatically varying the output of a variable displacement pump of the kind having two banks of radially disposed pistons in response to changes in the load on the pump. It will be appreciated that the apparatus herein described as a pump will function as a motor in the opposite sense, and hence the term "pump" as used herein is intended to include motors and machines which will function either as pumps or motors. The control mechanism includes a reciprocable yoke arrangement and a control valve assembly which coact to permit precise regulation of the output pressure of the pump to be obtained and which utilizes a regulated pressure as a biasing force to minimize problems of sticking of the valve and malfunctioning of the pump. The manner in which the regulated pressure is obtained and applied as a bias force also enables a conveniently small and compact valve assembly to be obtained.

Also in accordance with this invention there is provided a hydrodynamic lubrication arrangement which is especially effective to insure adequate lubrication at high temperatures.

Hence, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:
1. A variable displacement fluid power device comprising: an outer housing; a pair of axially aligned reaction members, each having elliptical inner surfaces, mounted within said outer housing for a limited amount of rotation therein; a rotor member disposed within said reaction members and formed with a pair of axially spaced, radial bores; inlet and outlet conduit means for conducting fluid to and from said bores; piston means disposed within each bore and biased toward one of said elliptical inner surfaces and reciprocable within the bore by rotation of the rotor within the reaction member; and means for rotating said reaction members with respect to said inlet and outlet conduit means to vary the output of said fluid power device including, a yoke member shiftable in one coordinate direction, ring members connected to the reaction members, and pin means connecting the yoke member and ring members to rotate the latter synchronously in response to linear movement of the yoke member.

2. A variable displacement fluid power device comprising: an outer housing; a pair of axially aligned reaction members, each having elliptical inner surfaces, mounted within said outer housing for a limited amount of rotation therein; a rotor member disposed within said reaction members and formed with a pair of axially spaced, radial bores; common inlet and common outlet conduit means for conducting fluid to and from said bores; piston means disposed within each bore and biased toward one of said elliptical inner surfaces and reciprocable within the bore by rotation of the rotor within the reaction member; and means for rotating said reaction members with respect to said inlet and outlet conduit means to vary the output of said fluid power device including, a yoke member, guide and roller means constraining the yoke member for movement in a linear path in opposite directions within the housing, rotatable ring members connected to the reaction members, said ring members having radially slotted end portions adjacent said yoke member, and pin means extending from the yoke member and disposed within the radial slots in the end portions to translate linear movement of the yoke member in one direction into rotary movement of one of said ring members.

3. A variable displacement pump comprising: an outer housing; a pair of axially aligned reaction members, each having elliptical inner surfaces, mounted within said outer housing for a limited amount of rotation therein; a rotor member disposed within said reaction members and formed with a pair of axially spaced, radial bores; common inlet and common outlet conduit means for conducting fluid to and from said bores; piston means disposed within each bore and biased toward one of said elliptical inner surfaces and reciprocable within the bore by rotation of the rotor within the reaction member; and means for rotating said reaction members with respect to said inlet and outlet conduit means to vary the phase of the pumping actions of said piston means and thereby vary the output of said fluid power device including, a yoke member shiftable in one coordinate direction within the housing and connected to said reaction members, means operated by the yoke member translating linear movement thereof in said co-ordinate direction into synchronous rotary movement of said reaction members to vary the pump phase, first and second opposed pistons adapted to shift the yoke member back and forth in said one coordinate direction, said first piston being of larger effective area than said second piston; and control means including valve and conduit means for applying the output pressure of the variable displacement pump to said second piston and a control pressure to said first piston.

4. A variable displacement pump as defined in claim 3 wherein said valve means comprise a valve spool and restrictor means for developing a regulated pressure of predetermined magnitude in comparison to the magnitude of said output pressure, and wherein biasing means and said regulated pressure are applied to one end of said valve spool and said output pressure is applied to an opposite end of said valve spool to vary the axial position of the valve spool in accordance with the load applied to said fluid power device to thereby vary the control pressure applied to said first piston.

5. A variable displacement fluid power device comprising: an outer housing; a pair of axially aligned reaction members, each having elliptical inner surfaces, mounted within said outer housing for a limited amount of relative rotation with respect to one another; a rotor member disposed within said reaction members and formed with a pair of axially spaced, radial bores; a piston member disposed within each bore and defining a pressure chamber therein, said piston member being formed with an arcuate recess in the end adjacent said elliptical inner surfaces; a roller disposed within each of said recesses and engageable with an elliptical inner surface so that each piston is reciprocable within the bore by rotation of the rotor within the reaction member; pintle means having axially spaced but radially aligned inlet conduit means formed therein so as to periodically communicate with said axially spaced pressure chambers whenever said rotor is rotated within said reaction members, and actuator means for counter-rotating said reaction members to vary the phase relationship of the pistons within the axially spaced bores to thereby vary the output of fluid power device, said actuator means including: a yoke member shiftable in one co-ordinate path and connected to said reaction members to counter-rotate the same as aforesaid, and means normally holding the yoke member in a neutral position in said path including a piston having a cylinder in communication with the output of the device and exerting a first force on the yoke tending to move the latter in one direction along said path in response to an increase in the output pressure of the device to produce compensating counter rotation of said reaction members, and control means exerting a biasing force of predetermined magnitude acting on the yoke in opposition to said first force and representing the desired output pressure of the device.

6. In a variable displacement fluid power device of the kind wherein a rotor member includes two axially spaced banks of radial cylinders and pistons which are intercommunicated by common inlet and common outlet conduits and wherein two reaction members have elliptical inner peripheries for reciprocating the pistons within the cylinders and are each rotatable with respect to the inlet and outlet conduits and with respect to one another to vary the phase of the pumping action of each set of pistons; rotary means connected to said reaction members for rotating said reaction members to vary the phase aforesaid, a linearly movable actuator member pinned to said rotary means to impart phase varying rotation thereto, guide means constraining said actuator member for movement along a linear path, and means normally holding the actuator member in a neutral position including a piston having a cylinder in communication with the output of the device and exerting a first force on the actuator member tending to move the latter in one direction in response to an increase in output pressure of the device to impart corresponding rotation to the rotary means and to produce simultaneous phase compensation in the reaction members, and control means exerting a bias force of predetermined magnitude acting on the actuator member in opposition to said first force and representing the desired output pressure of the device.

7. In a variable displacement fluid power device of the kind wherein a rotor member includes two axially spaced banks of radial cylinders and pistons which are intercommunicated by common inlet and common outlet conduits and wherein two reaction members having elliptical inner peripheries for reciprocating the pistons within the cylinders and are each rotatable with respect to the inlet and outlet conduits and with respect to one another to vary the phase of the pumping action of each set of pistons; means supporting said pistons for movement along the elliptical inner peripheries thereof, and means for rotating said reaction members synchronously in phase variance and comprising a yoke member movable in a linear path, a rotatable member pinned to the yoke member whereby linear motion of the yoke member is translated into rotary motion of said rotatable member, said rotatable member being connected to the reaction members to produce rotation thereof as aforesaid, and means normally holding the yoke member in a neutral position including a piston having a cylinder in communication with the output of the pump and exerting a first force on the yoke tending to move the latter in one direction in response to an increase in the output pressure of the pump to produce corresponding compensation in the reaction members, and control means exerting a biasing force of predetermined magnitude acting on the yoke in opposition to said first force and representing the desired output pressure of the device.

References Cited in the file of this patent

UNITED STATES PATENTS

| | | |
|---|---|---|
| 2,032,079 | Benedek | Feb. 25, 1936 |
| 2,063,464 | Schindler | Dec. 8, 1936 |
| 2,143,937 | Chandler | June 17, 1939 |
| 2,295,813 | Tucker | Sept. 15, 1942 |
| 2,359,513 | Eden et al. | Oct. 3, 1944 |
| 2,368,791 | Waldie | Feb. 6, 1945 |
| 2,371,078 | Summers | Mar. 6, 1945 |
| 2,453,538 | Rauch | Nov. 9, 1948 |
| 2,462,500 | Hoffer | Feb. 22, 1949 |
| 2,502,546 | Adams | Apr. 4, 1950 |
| 2,506,974 | Sorensen | May 9, 1950 |
| 2,612,110 | Delegrad | Sept. 30, 1952 |
| 2,646,755 | Joy | July 28, 1953 |
| 2,680,412 | Entwistle | June 8, 1954 |
| 2,793,921 | Phipps | May 28, 1957 |
| 2,855,858 | Larsen et al. | Oct. 14, 1958 |
| 2,862,455 | Ferris | Dec. 2, 1958 |
| 2,872,875 | Mergen et al. | Feb. 10, 1959 |